US012646802B2

(12) United States Patent
Lee et al.

(10) Patent No.: US 12,646,802 B2
(45) Date of Patent: Jun. 2, 2026

(54) METHOD FOR MANUFACTURING ELECTRODE ASSEMBLY FOR ELECTROCHEMICAL DEVICE, ELECTRODE ASSEMBLY OBTAINED BY SAME METHOD, AND METHOD FOR MANUFACTURING ELECTROCHEMICAL DEVICE

(71) Applicant: LG ENERGY SOLUTION, LTD., Seoul (KR)

(72) Inventors: So-Yeong Lee, Daejeon (KR); So-Mi Jeong, Daejeon (KR); Won-Sik Bae, Daejeon (KR); Jong-Yoon Lee, Daejeon (KR); So-Jung Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 556 days.

(21) Appl. No.: 18/036,836

(22) PCT Filed: Sep. 1, 2022

(86) PCT No.: PCT/KR2022/013093
§ 371 (c)(1),
(2) Date: May 12, 2023

(87) PCT Pub. No.: WO2023/033559
PCT Pub. Date: Mar. 9, 2023

(65) Prior Publication Data
US 2023/0299417 A1 Sep. 21, 2023

(30) Foreign Application Priority Data
Sep. 2, 2021 (KR) ......................... 10-2021-0117235

(51) Int. Cl.
| | |
|---|---|
| *H01M 50/403* | (2021.01) |
| *H01M 50/417* | (2021.01) |
| *H01M 50/451* | (2021.01) |
| *H01M 50/491* | (2021.01) |

(52) U.S. Cl.
CPC ....... *H01M 50/403* (2021.01); *H01M 50/417* (2021.01); *H01M 50/451* (2021.01); *H01M 50/491* (2021.01)

(58) Field of Classification Search
CPC ............. H01M 50/403; H01M 50/471; H01M 50/417; H01M 50/449; H01M 50/451; H01M 50/457; H01M 50/46; H01M 50/489; H01M 50/491
See application file for complete search history.

(56) References Cited

U.S. PATENT DOCUMENTS

| | | | |
|---|---|---|---|
| 2011/0195294 A1 | 8/2011 | Lee et al. | |
| 2011/0262814 A1* | 10/2011 | Ikemoto | C08J 5/18 |
| | | | 429/249 |
| 2015/0270521 A1 | 9/2015 | Uehara et al. | |
| 2019/0221880 A1 | 7/2019 | Hirai et al. | |
| 2019/0273233 A1 | 9/2019 | Morin et al. | |
| 2021/0143511 A1 | 5/2021 | Zhang et al. | |
| 2021/0202990 A1 | 7/2021 | Lee et al. | |
| 2021/0210818 A1* | 7/2021 | Park | H01M 50/451 |
| 2021/0249735 A1 | 8/2021 | Saeki | |
| 2022/0140383 A1 | 5/2022 | Kim | |
| 2022/0181688 A1 | 6/2022 | Lee et al. | |
| 2024/0313347 A1* | 9/2024 | Zhang | H01M 4/13 |

FOREIGN PATENT DOCUMENTS

| | | |
|---|---|---|
| CN | 109314203 A | 2/2019 |
| CN | 109952666 A | 6/2019 |
| CN | 111463390 A | 7/2020 |
| EP | 3 420 606 A1 | 1/2019 |
| JP | H09-050800 A | 2/1997 |
| JP | 2010-077335 A | 4/2010 |
| JP | 2010232122 * | 10/2010 |
| JP | 2013-016407 A | 1/2013 |
| JP | 2015-120786 A | 7/2015 |
| JP | 2016-188374 A | 11/2016 |
| JP | 2017-082127 A | 5/2017 |
| JP | 2017-130269 A | 7/2017 |
| JP | 6347801 B2 | 6/2018 |
| JP | 6424261 B2 | 10/2018 |
| JP | 2018-181546 A | 11/2018 |
| JP | 2022-542178 A | 9/2022 |

(Continued)

OTHER PUBLICATIONS

JP2010232122 English translation. Yamahira et al. Japan. Oct. 14, 2010. (Year: 2010).*
Office Action issued on Jun. 23, 2025 in Chinese Patent Application No. 202280007625.3.
Cannarella John et al: "The Effects of Defects on Localized Plating in Lithium-Ion Batteries", Journal of the Electrochemical Society, vol. 162, No. 7, Apr. 28, 2015 (Apr. 28, 2015), pp. A1365-A1373, XP093213984, Journal of the Electrochemical Society2018Electrochemical Society Inc.usa ISSN: 0013-4651, DOI: 10.1149/2.1051507jes, figure 1; table 1.

(Continued)

*Primary Examiner* — Christopher P Domone
(74) *Attorney, Agent, or Firm* — Morgan, Lewis & Bockius LLP

(57) ABSTRACT

An electrode assembly manufacturing method according to the present disclosure uses a pre-compressed separator substrate. Therefore, a reduction in thickness of the separator by the pressure applied in a lamination process during the manufacture of an electrode assembly is small. For this reason, the separator of the electrode assembly manufactured by the method exhibits high insulation performance and does not experience a decrease in dielectric breakdown voltage. In addition, even though high pressure is applied during the lamination process, damage to the separator is small, and the processing speed is fast, resulting in process efficiency.

20 Claims, No Drawings

(56) References Cited

FOREIGN PATENT DOCUMENTS

| KR | 10-0352562 B1 | 9/2002 |
| KR | 10-1029672 B1 | 4/2011 |
| KR | 10-1650418 B1 | 8/2016 |
| KR | 10-2016-0126961 A | 11/2016 |
| KR | 10-2017-0131857 A | 12/2017 |
| KR | 10-2018-0096097 A | 8/2018 |
| KR | 10-2019-0076913 A | 7/2019 |
| KR | 10-2019-0127663 A | 11/2019 |
| KR | 10-2020-0007745 A | 1/2020 |
| KR | 10-2020-0069256 A | 6/2020 |
| KR | 10-2219741 B1 | 2/2021 |
| KR | 10-2021-0035667 A | 4/2021 |
| KR | 10-2021-0091597 A | 7/2021 |
| WO | 2014/034448 A1 | 3/2014 |
| WO | 2020/004205 A1 | 1/2020 |
| WO | WO2020013671 * | 1/2020 |
| WO | 2020/192845 A1 | 10/2020 |
| WO | 2021/145690 A1 | 7/2021 |

OTHER PUBLICATIONS

Zhang Xiaowei et al: "Li-ion Battery Separators, Mechanical Integrity and Failure Mechanisms Leading to Soft and Hard Internal Shorts", Scientific Reports, [Online] vol. 6, No. 1, Sep. 1, 2016 (Sep. 1, 2016), XP093213993, US , ISSN: 2045-2322, DOI: 10.1038/srep32578 Retrieved from the Internet: URL:https://www.nature.com/articles/srep32 578, [retrieved on Oct. 11, 2024], figure 2.

Kalnaus Sergiy et al: "Temperature and strain rate dependent behavior of polymer separator for Li-ion batteries", Extreme Mechanics Letters, vol. 20, Apr. 1, 2018 (Apr. 1, 2018), pp. 73-80, XP093214068,NL, ISSN: 2352-4316, DOI:10.1016/j.eml.2018.01.006, chapters 3.2, 3.3.

Extended Search Report issued on Oct. 28, 2024 in European Patent Application No. 22865061.0.

Office Action issued Jul. 18, 2023 for counterpart Korean Patent Application No. 10-2022-0110983.

Office Action dated Oct. 16, 2023, issued in corresponding Korean Patent Application No. 10-2022-0110983.

International Search Report (with partial translation) and Written Opinion dated Dec. 27, 2022, issued in corresponding International Patent Application No. PCT/KR2022/013093.

Office Action issued on May 20, 2024 in Japanese Patent Application No. 2023-531685.

* cited by examiner

METHOD FOR MANUFACTURING ELECTRODE ASSEMBLY FOR ELECTROCHEMICAL DEVICE, ELECTRODE ASSEMBLY OBTAINED BY SAME METHOD, AND METHOD FOR MANUFACTURING ELECTROCHEMICAL DEVICE

TECHNICAL FIELD

The present disclosure claims the benefit of the filing date of Korean Patent Application No. 10-2021-0117235 filed with the Korean Intellectual Property Office on Sep. 2, 2021, the entire contents of which is incorporated in the present disclosure by reference. The present disclosure relates to a method for manufacturing an electrode assembly for an electrochemical device and an electrode assembly manufactured by the method. In addition, the present disclosure relates to an electrochemical device, including the electrode assembly and a method for manufacturing the same.

BACKGROUND ART

Porous polymer film substrates are used as separators for electrochemical devices such as secondary batteries. In general, an electrode assembly is manufactured through a lamination process in which a separator and an electrode are bonded by heat and pressure, and the higher the heat and pressure applied in this process, the higher the binding force between the electrode and the separator. Recently, as the processing speed is increased to improve productivity, the time to apply heat to a separator is decreased, and thus, a binding force is to be ensured by increasing pressure to ensure the binding force, but the separator may be deformed by high pressure. In addition, during the lamination process, the thickness of the polymer film substrate is greatly reduced, and the damage to the pores is increased, so not only the performance of the battery but also the dielectric breakdown voltage of the separator is reduced, resulting in hi-pot defects and low voltage defects. Accordingly, it is necessary to develop a porous polymer film substrate for a separator that is less deformed even under high-pressure lamination conditions.

DISCLOSURE

Technical Problem

An objective of the present disclosure is to provide a separator substrate having a low thickness change rate or strain rate and a high dielectric breakdown voltage during a lamination process for manufacturing an electrode assembly and an electrode assembly including the same. In addition, an objective of the present disclosure is to provide a method for manufacturing an electrode assembly having improved performance as described above. Another objective of the present disclosure is to provide an electrochemical device, including the electrode assembly and a manufacturing method thereof. It will be readily apparent that the objectives and advantages of the present disclosure may be realized by means or methods and combinations thereof recited in the claims.

Technical Solution

The first aspect of the present disclosure relates to a method for manufacturing an electrode assembly for an electrochemical device, the method including:

S100 preparing a porous polymer film member;

S200 preparing a separator for an electrochemical device by pressing the polymer film member to form a porous separator substrate; and S300 manufacturing an electrode assembly including the separator, a cathode, and an anode, in which the polymer film member in step S100 has a porosity in a range of 40 to 70 vol %, after performing the step S200, the separator substrate has a thickness of 90% or less based on the thickness of the polymer film member before the pressing.

In the second aspect of the present disclosure, according to the first aspect, forming an organic/inorganic composite coating layer including inorganic particles and a binder resin on one or both sides of the polymer film member obtained in step S200 is further included in the first aspect.

In a third aspect of the present disclosure, after performing the step S200, the porous separator substrate has a porosity in a range of 30 to 60 vol % according to the first aspect or the second aspect.

In a fourth aspect of the present disclosure, according to any one of the first to third aspects, the step S200 is performed using a pressing roller or a pressing jig.

In a fifth aspect of the present disclosure, according to any one of the first to fourth aspects, the step S200 is performed by hot pressing.

In the sixth aspect of the present disclosure, according to any one of the first to fifth aspects, the pressing is performed in a pressure range of 3.0 to 8.0 MPa.

In the seventh aspect of the present disclosure is that, according to any one of the first to sixth aspects, the polymer film member includes a polyolefin resin.

In the eighth aspect of the present disclosure, according to any one of the first to seventh aspects, the polymer film member is prepared by a wet manufacturing method in which pores are formed by extracting a pore-forming agent.

In the ninth aspect of the present disclosure, according to any one of the first to eighth aspects, the polymer film member is prepared by a dry manufacturing method in which pores are formed by melting and extruding a polymer resin and subsequently stretching the extruded polymer resin.

A tenth aspect of the present disclosure relates to an electrode assembly for an electrochemical device, the electrode assembly is obtained by the method according to any one of the first to ninth aspects and includes a separator, a cathode, and an anode, in which the separator includes a porous separator substrate.

An eleventh aspect of the present disclosure relates to an electrode assembly for an electrochemical device, the electrode assembly is obtained by the method according to any one of the second to ninth aspects, in which the separator includes the porous separator substrate and an organic/inorganic composite coating layer on one surface or both surfaces of the porous separator substrate, and the organic/inorganic composite coating layer includes inorganic particles and a binder resin.

A twelfth aspect of the present disclosure relates to a method for manufacturing an electrochemical device, the method including an electrode assembly obtained by the method according to any one of the first to ninth aspects, in which the electrode assembly includes a separator, a cathode, and an anode, and the separator includes a porous separator substrate.

In a thirteenth aspect of the present disclosure, according to the twelfth aspect, the electrode assembly is manufactured by disposing a separator between a cathode and an anode and laminating.

A fourteenth aspect of the present disclosure relates to a method for manufacturing an electrochemical device comprising an electrode assembly obtained by the method according to the second aspect, wherein the electrode assembly includes a separator, a cathode, and an anode, in which the separator includes a porous separator substrate and an organic/inorganic composite coating layer on one or both surfaces of the porous separator substrate, and the organic/inorganic composite coating layer includes inorganic particles and a binder resin.

Advantageous Effects

The electrode assembly manufacturing method, according to the present disclosure, uses a pre-compressed separator substrate so that the thickness reduction rate of the separator due to the pressure applied during the lamination process for manufacturing the electrode assembly is small. Accordingly, the separator of the electrode assembly, according to the manufacturing method, has high insulation properties without a decrease in dielectric breakdown voltage. In addition, even if high pressure is applied during the lamination process, the damage to the separator is small, and the processing speed can be increased, thereby improving processability.

BEST MODE

Hereinafter, the present disclosure will be described in detail. Before proceeding, it should be noted that the terms or words used in this specification and claims should not be interpreted solely based on their conventional or dictionary meanings. The inventor must properly understand the concept behind each term to effectively describe their disclosure. Based on the principle that it can be defined, and it should be interpreted as meaning and concept consistent with the technical idea of the present disclosure. Therefore, since the configurations described in the embodiments described herein are only the most preferred embodiments of the present disclosure and do not represent all the technical ideas of the present disclosure, it should be understood that there may be various equivalents and modifications that may replace them at the time of the present application.

Throughout this specification, when a part "includes" a certain component, it means that other components may be further included, rather than excluding other components, unless otherwise stated.

In addition, the terms "about", "substantially", etc., used throughout this specification are used as meanings at or close to the numerical values when manufacturing and material tolerances inherent in the stated meanings are presented to aid the understanding of the present application. It is used to prevent an unconscionable infringer from using the mentioned disclosure in an unreasonable way.

Throughout this specification, the description of "A and/or B" means "A or B or both".

In the present specification, the porous property means that a gaseous and/or liquid fluid can pass through one side and the other side of the object by a structure in which the object includes a plurality of pores, and the pores are connected to each other.

The present disclosure relates to a separator substrate that can be applied to a separator of an electrode assembly for an electrochemical device and an electrode assembly including the separator substrate. In addition, the present disclosure relates to an electrochemical device, including the electrode assembly. Finally, the present disclosure relates to a method for manufacturing the electrode assembly and the electrochemical device. In the present disclosure, the electrochemical device is a device that converts chemical energy into electrical energy by an electrochemical reaction and is a concept encompassing a primary battery and a secondary battery. In the present specification, the secondary battery is capable of charging and discharging and means a lithium-ion secondary battery, a nickel-cadmium battery, a nickel-hydrogen battery, and the like.

In the present specification, the separator has a porous property including a plurality of pores and serves as an ion-conducting barrier to pass ions while blocking electrical contact between the cathode and the anode in an electrochemical device.

In the present disclosure, the separator of the electrode assembly includes a porous separator substrate. As will be described later, the separator substrate is prepared by pressing a porous polymer film member. The separator may further include an additional layer disposed on at least one surface of the separator substrate, if necessary, in terms of material or function. In one embodiment of the present disclosure, the separator may have an organic/inorganic composite coating layer, including inorganic particles and/or a binder resin formed on at least one side or both sides of the porous substrate.

Next, the electrode assembly manufacturing method and the electrode assembly according to the present disclosure will be described in more detail.

The electrode assembly manufacturing method, according to the present disclosure, includes:

S100 preparing a porous polymer film member;

S200 preparing a separator for an electrochemical device by pressing the polymer film member to form a porous separator substrate; and S300 manufacturing an electrode assembly including the separator, a cathode, and an anode, in which the polymer film member in the step S100 has a porosity in a range of 40 to 70 vol %, and the thickness of the separator substrate obtained after performing the step S200 is smaller than the thickness of the polymer film member before the pressing.

The polymer film member is a porous film including a polymer material and may have a porosity in a range of 40 to 70 vol % in terms of battery output and cycle characteristics.

In the present disclosure, the term "porosity" refers to a ratio of a volume occupied by pores with respect to the total volume, a unit thereof is in vol %, and may be used interchangeably with terms such as void rate, porosity, or the like. In the present disclosure, the measurement method of porosity is not particularly limited. In one embodiment of the present disclosure, for example, Brunauer-Emmett-Teller (BET) measurement using nitrogen gas or mercury permeation (Hg porosimeter) may be used for the measurement of the porosity. Alternatively, in one embodiment of the present disclosure, on the basis of the density (apparent density) of an obtained electrode (electrode active material layer), the content ratio of the materials included in the electrode (electrode active material layer), and the density of each component of the electrode active material layer, the net density of the electrode active material layer is calculated. In addition, the porosity of the electrode active material layer can be calculated from the difference between the apparent density and the net density.

In one embodiment of the present disclosure, the polymer film member may have a pore diameter in a range of 10 to 100 nm. The pore size may be calculated from the pore size distribution measured using a capillary flow porometer method. For example, at first, after wetting the separator substrate to be measured with a wetting agent such as the galwick solution, the air pressure on one side of the substrate is gradually increased. At this time, when the applied air pressure is greater than the capillary attraction of the wetting agent present in the pore, the wetting agent blocking the pore is pushed out, and the pore size and distribution can be measured through the pressure and flow rate at the moment of being pushed out. In one embodiment, the air pressure range can be controlled in a range of 30 to 450 psi.

In the present disclosure, the polymer film substrate may have a thickness in a range of 5 to 30 μm. When the thickness of the porous substrate does not fall within the above numerical range, it is difficult to secure an appropriate thickness for the separator substrate after pressing. On the other hand, if the range is exceeded too much (i.e., too thick), the resistance of the separator may increase excessively.

Meanwhile, in one embodiment of the present disclosure, the polymer material may include a thermoplastic resin from the viewpoint of imparting a shutdown function. The shutdown function refers to a function of preventing the thermal runaway of the battery by blocking the movement of ions between the cathode and the anode by closing the pores of the porous substrate by melting the polymer resin when the battery temperature is high.

As such, a thermoplastic resin, a thermoplastic resin having a melting point of less than 200° C. may be used, and in particular, a polyolefin-based polymer resin may be included. Examples of polyolefin-based polymer resins include polyethylene, polypropylene, and polypentene. In one embodiment of the present disclosure, the thermoplastic resin may include two or more selected from polyethylene, polypropylene, and polypentene.

On the other hand, in one specific embodiment of the present disclosure, the polymer film member may further include at least one among polymer resins such as polyethylene terephthalate, polybutylene terephthalate, polyacetal, polyamide, polycarbonate, polyimide, polyetherether ketone, polyether sulfone, polyphenylene oxide, polyphenylene sulfide, and polyethylene naphthalate.

In one embodiment of the present disclosure, the polymer film member may be formed by melting and extruding a polymer material into a sheet shape and then stretching the polymer material, causing micro-cracks between lamella, which is a crystal part of the polymer, to form fine pores (dry method). Alternatively, the polymer film member may be prepared by kneading a polymer material with diluents at a high temperature to form a single phase, phase-separating the polymer material and plasticizer in a cooling process, and then extracting the plasticizer to form pores (wet method).

When the polymer film member is prepared as described above, the polymer film member is then pressurized to prepare a porous separator substrate S200.

In one embodiment of the present disclosure, it is preferable to apply a pressurizing method by surface pressure rather than linear pressure in terms of applying constant and even pressure over the entire surface of the polymer film member. Specifically, the pressurizing may be performed using a flat plate jig. In addition, the pressurizing may be performed by a pressurizing method with heating. For example, the pressurizing may be performed by a hot-pressing method. In one embodiment of the present disclosure, in the pressurizing process, the temperature may be adjusted within the range of about 50° C. to 80° C., the pressure may be adjusted within the range of 3.0 to 8.0 MPa, and the time may be adjusted within the range of 1 second (sec) to 20 seconds (sec). The temperature, pressure, and time conditions are each independently controlled. However, the pressurizing process conditions of the present disclosure are not limited to the above range and may be appropriately adjusted within a range in which a porous separator substrate having an appropriate thickness and porosity can be obtained by pressing the polymer film member.

In the present disclosure, the thickness of the separator substrate obtained after performing the step S200 is smaller than that of the polymer film member before the pressurizing. In a specific embodiment of the present disclosure, the separator substrate may have a thickness of 99% to 70% based on the thickness of the polymer film member before pressurizing.

Meanwhile, in the present disclosure, after performing step S200, the porosity of the porous separator substrate may represent a level of 50 to 80 vol % based on the porosity of the polymer film member. In addition, after performing the step S200, the porosity of the porous separator substrate may be 30 to 60 vol %.

Meanwhile, in one embodiment of the present disclosure, the separator may further include an organic/inorganic composite coating layer formed on at least one surface of the separator substrate.

The organic/inorganic composite coating layer includes a binder resin and inorganic particles and has a porous property. In one embodiment of the present disclosure, the binder resin and inorganic particles in the organic/inorganic composite coating layer may be included in a weight ratio of 1:99 to 30:70. The ratio may be appropriately adjusted within the above range, for example, when the sum of the binder resin and the inorganic particles is 100% by weight, the binder resin may be 1% by weight or more, 5% by weight or more or 10% by weight or more and the inorganic particles may be 80% by weight or more, 85% by weight or more, 90% by weight or more, or 95% by weight or more.

The organic/inorganic composite coating layer may be formed by binding inorganic particles with a binder resin and integrating them within the layer. The pores inside the organic/inorganic composite coating layer may be caused by an interstitial volume, which is an empty space between the inorganic particles.

In one embodiment of the present disclosure, the porosity of the heat resistant layer in the organic/inorganic composite coating layer may be 30 to 70 vol %. When the porosity is 70 vol % or less, it is suitable to ensure dynamic characteristics that may endure a press process that bonds to an electrode and to ensure binding force because a surface aperture ratio is not too high. On the other hand, when the porosity is 30 vol % or more, it is advantageous in terms of ion permeability.

The thickness of the organic/inorganic composite coating layer may be formed to be 1 to 20 μm with respect to any one side of the separator substrates but is not particularly limited thereto. The thickness may be adjusted within an appropriate range by those skilled in the art in terms of heat resistance or electrical resistance.

In the present disclosure, non-limiting examples of binder resins that can be used for the organic/inorganic composite coating layer may include at least one polymer resin selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cyanoethyl pullulan, cyanoethyl polyvinylalcohol, cyanoethyl cellulose, cyanoethyl sucrose, pullulan, and carboxyl methyl cellulose, or a mixture of two or more thereof. However, the present disclosure is not particularly limited thereto.

In a specific embodiment of the present disclosure, the inorganic particles that can be used in the organic/inorganic composite coating layer are not particularly limited as long as they are electrochemically stable. That is, the inorganic particles that can be used in the present disclosure are not particularly limited as long as oxidation and/or reduction reactions do not occur in the operating voltage range of the applied electrochemical device (e.g., 0 to 5 V based on Li/Li$^+$).

Non-limiting examples of the inorganic particles may include BaTiO$_3$, Pb(Zr,Ti)O$_3$ (PZT), Pb$_{1-x}$La$_x$Zr$_{1-y}$Ti$_y$O$_3$ (PLZT, 0<x<1, 0<y<1), Pb (Mg$_{1/3}$Nb$_{2/3}$)O$_3$—PbTiO$_3$ (PMN-PT), hafnium (HfO$_2$), SrTiO$_3$, SnO$_2$, CeO$_2$, MgO, Mg(OH)$_2$, NiO, CaO, ZnO, ZrO$_2$, SiO$_2$, Y$_2$O$_3$, Al$_2$O$_3$, SiC, Al(OH)$_3$, TiO$_2$, aluminum peroxide, zinc tin hydroxide (ZnSn(OH)$_6$), tin-zinc oxide (Zn$_2$SnO$_4$, ZnSnO$_3$), antimony trioxide (Sb$_2$O$_3$), antimony tetraoxide (Sb$_2$O$_4$), antimony pentoxide (Sb$_2$O$_5$), etc., and the inorganic particles may include one or two or more of them.

In addition, the average diameter (D50) of the inorganic particles is not particularly limited but is preferably in the range of 0.3 to 1 μm in order to form a coating layer having a uniform thickness and an appropriate porosity. When the average diameter of the inorganic particles is less than 0.3 μm, the dispersibility of the inorganic particles in the slurry prepared for preparing the heat-resistant layer may be reduced, and when the average diameter of the inorganic particles is more than 1 μm, the thickness of the formed coating layer may increase.

In one embodiment of the present disclosure, the method of forming the organic/inorganic composite coating layer is, for example, as follows. At first, a polymer solution is prepared by dissolving a binder resin in an appropriate organic solvent. It is preferable that the solvent may have a solubility parameter similar to that of the binder polymer to be used and a boiling point that is low. This is to facilitate uniform mixing and subsequent solvent removal. Non-limiting examples of the solvent that can be used may include acetone, tetrahydrofuran, methylene chloride, chloroform, dimethylformamide, N-methyl-2-pyrrolidone (NMP), cyclohexane, water, or a mixture thereof.

Thereafter, inorganic particles are added and dispersed in the prepared polymer solution. In the present disclosure, the content ratio of the inorganic particles and the binder is as described above and is appropriately adjusted in consideration of the thickness, pore size, and porosity of the heat-resistant layer of the present disclosure that is finally manufactured.

Next, the inorganic particle slurry prepared above is applied to at least one side of the prepared separator substrate and dried. A method of applying the slurry on the surface of the separator substrate is not particularly limited to any one method, and a conventional method known in the art may be used. For example, various methods such as dip coating, die coating, roll coating, comma coating, or a mixture thereof may be used.

In the drying process, temperature and time conditions are appropriately set to minimize the occurrence of surface defects of the organic/inorganic composite coating layer. The drying may be performed by a drying aid device such as a drying oven or hot air within an appropriate range.

When the separator is prepared as described above, an electrode assembly including the separator, a cathode, and an anode is manufactured S300.

As described above, in the method for manufacturing an electrode assembly according to the present disclosure, a polymer film member is pressurized, and the resultant is used as a separator substrate. Since the separator substrate is pre-pressurized and prepared before being put into manufacturing the electrode assembly, deformation in the thickness of the separator may be reduced during the lamination process for manufacturing the electrode assembly. In addition, when the separator includes an organic/inorganic composite porous layer, damage due to the pressing of inorganic particles on the surface of the separator substrate facing the organic/inorganic composite porous layer during the lamination process may be reduced.

The manufacture of the electrode assembly may be performed by a lamination process in which the separator obtained by the above-described method is stacked between the anode and the cathode and bonded by applying heat and/or pressure. In one embodiment of the present disclosure, the lamination process may be performed by a roll press device, including a pair of pressing rollers. That is, an anode, a separator, and a cathode are sequentially stacked and put between the pressing rollers to achieve interlayer bonding. In this case, the lamination process may be performed by a pressurizing method with heat. As described above, since the separator substrate is pre-pressurized and prepared before the lamination process for manufacturing the electrode assembly, the deformation of the thickness of the separator due to pressure applied in the lamination process may be reduced, and damage to the surface of the porous substrate may be reduced.

Meanwhile, the present disclosure provides a secondary battery including the electrode assembly. The battery includes an electrode assembly including an anode, a cathode, and a separator interposed between the anode and the cathode, and the separator includes a separator substrate obtained by pressurizing a polymer film member, as described above.

In the present disclosure, the cathode includes a cathode current collector and a cathode active material layer, including a cathode active material, a conductive material, and a binder resin on at least one surface of the current collector. The cathode active material may include one or two or more of a mixture among layered compounds such as lithium manganese oxide (LiMn$_2$O$_4$, LiMnO$_2$, etc.), lithium cobalt oxide (LiCoO$_2$), lithium nickel oxide (LiNiO$_2$), or a compound substituted with one or more transition metals; lithium manganese oxides of the formula Li$_{1-x}$Mn$_{2-x}$O$_4$ (where x is 0 to 0.33), LiMnO$_3$, LiMn$_2$O$_3$, LiMnO$_2$, and the like; lithium copper oxide (Li$_2$CuO$_2$); vanadium oxides, such as LiV$_3$O$_8$, LiV$_3$O$_4$, V$_2$O$_5$, and Cu$_2$V$_2$O$_7$; Ni site-type lithium nickel oxide represented by the formula LiNi$_{1-x}$MxO$_2$ (where M=Co, Mn, Al, Cu, Fe, Mg, B, or Ga, and x=0.01 to 0.3); lithium manganese composite oxides represented by the formula LiMn$_{1-x}$M$_x$O$_2$ (where M=Co, Ni, Fe, Cr, Zn, or Ta and x=0.01 to 0.1) or Li$_2$Mn$_3$MO$_8$ (where M=Fe, Co, Ni, Cu, or Zn); LiMn$_2$O$_4$ in which a part of Li in the formula is substituted with an alkaline earth metal ion; disulfide compounds; Fe$_2$(MoO$_4$)$_3$.

In the present disclosure, the anode includes an anode current collector and an anode active material layer including an anode active material, a conductive material, and a binder resin on at least one surface of the current collector. The anode may include, as an anode active material, at least one component or a mixture of two or more of a mixture as an anode active material selected from the group consisting of lithium metal oxide; carbons such as non-graphitized carbon, and graphite-based carbon; metal composite oxides such as $Li_xFe_2O_3(0\leq x\leq 1)$, $Li_xWO_2$ $(0\leq x\leq 1)$, $Sn_xMe_{1-x}$ $Me'_yO_z$ (Me: Mn, Fe, Pb, Ge; Me': Al, B, P, Si, elements of groups 1, 2, and 3 of the periodic table, halogen; $0 < x\leq 1$; $1\leq y\leq 3$; $1\leq z\leq 8$); lithium metal; lithium alloy; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; titanium oxides.

In one specific embodiment of the present disclosure, the conductive material may be, for example, any one selected from the group consisting of graphite, carbon black, carbon fiber, or metal fiber, metal powder, conductive whisker, conductive metal oxide, activated carbon, and polyphenylene derivatives, or a mixture of two or more conductive materials. More specifically, the conductive material may be one selected from the group consisting of natural graphite, artificial graphite, super-p, acetylene black, Ketjen black, channel black, furnace black, lamp black, thermoblack, Denka black, aluminum powder, nickel powder, zinc oxide, potassium titanate, and titanium oxide, or a mixture of two or more of these conductive materials.

The current collector is not particularly limited as long as the current collector has high conductivity without causing a chemical change in the battery, and for example, stainless-steel, copper, aluminum, nickel, titanium, calcined carbon, or surface treatment material of aluminum or stainless steel with carbon, nickel, titanium, silver, etc., may be used.

As the binder resin, a polymer commonly used for electrodes in the art may be used. Non-limiting examples of such binder resins may include polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, and carboxyl methyl cellulose and the like, but are not limited thereto.

The electrode assembly prepared as described above may be loaded in an appropriate case, and electrolytes may be injected to manufacture a battery.

In the present disclosure, the electrolyte solution is a salt having the same structure as $A^+B^-$, and $A^+$ includes ions formed of alkali metal cations such as $Li^+$, $Na^+$, $K^+$, or a combination thereof, and $B^-$ includes ions formed of anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or a combination thereof. In the electrolyte, the salt may be dissolved or dissociated in an organic solvent or an organic solvent consisting of a mixture thereof, including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma butyrolactone (γ-butyrolactone), or a combination thereof, but is not limited thereto.

In addition, the present disclosure provides a battery module including a battery including the electrode assembly as a unit cell, a battery pack including the battery module, and a device including the battery pack as a power source. Specific examples of the device include a power tool powered by a battery motor; electric vehicles, including electric vehicles (EVs), hybrid electric vehicles (HEVs), plug-in hybrid electric vehicles (PHEVs), and the like; electric two-wheeled vehicles, including electric bicycles (E-bikes) and electric scooters (E-scooter); electric golf carts; and a power storage system, but is not limited thereto.

MODE FOR INVENTION

Hereinafter, examples will be given to describe the present disclosure in detail. However, the embodiments according to the present disclosure may be modified in various other forms, and the scope of the present disclosure should not be construed as being limited to the embodiments described below. The embodiments of the present disclosure are provided to more completely explain the present disclosure to those of ordinary skilled in the art.

Example

1. Preparation of a Porous Substrate

A polymer film member (thickness of about 15 μm) made of polyethylene was prepared, as shown in [Table 1] below. Each of the polymer film members was pressurized using a hot press to deform the thickness. The thickness reduction rate was calculated using [Formula 1] below. The pressing was performed under conditions of 60° C., 5.2 MPa, and 10 seconds (sec).

$$\text{Thickness reduction rate} = \{(\text{thickness of polymer film member} - \text{thickness of porous substrate})/\text{thickness of polymer film member}\} \times 100 \qquad \text{[Formula 1]}$$

TABLE 1

| | Porosity (%) (Polymer film member) | Thickness reduction rate (%) |
| --- | --- | --- |
| Example 1 | 45% | 10% |
| Example 2 | 65% | 16% |
| Comparative Example 1 | 5% | 0.3% |
| Comparative Example 2 | 25% | 2% |
| Comparative Example 3 | 85% | 48% |

2. Separator Preparation

Next, a separator was prepared by forming an organic/inorganic composite coating layer on the surface of the separator substrate obtained in each Example and Comparative Example.

PVDF-HFP was prepared as a binder resin and put into acetone as a solvent to prepare a polymer solution having a solid content concentration of 18% by weight. Inorganic particles, $Al_2O_3$, were added to the polymer solution, and a slurry for forming a coating layer was prepared. The content of the binder resin and the inorganic particles in the slurry was set to a ratio of 10:90 based on the weight ratio. Next, the slurry was applied on both sides of each separator substrate and dried to form an organic/inorganic composite coating layer having a thickness of 8 μm.

3. Production of Electrode Assembly

1) Preparation of a Cathode

A slurry for a cathode active material layer having a concentration of 50% by weight except for water was prepared by mixing a cathode active material $(LiNi_{0.8}Mn_{0.1}Co_{0.1}O_2)$, a conductive material (carbon black), a dispersing agent, and a binder resin (a mixture of PVDF-HFP and PVDF) with water in a weight ratio of 97.5:0.7:0.14:1.66. Next, the slurry was applied on the surface of an aluminum thin film (thickness: 10 μm) and dried to prepare a cathode having a cathode active material layer (thickness: 120 μm).

2) Preparation of an Anode

A slurry for an anode active material layer having a concentration of 50% by weight except for water was prepared by mixing a graphite (natural graphite and artificial graphite blend), a conductive material (carbon black), a dispersing agent, and a binder resin (a mixture of PVDF-HFP and PVDF) with water in a weight ratio of 97.5:0.7:0.14:1.66. Next, the slurry was applied on the surface of a copper thin film (thickness: 10 μm) and dried to prepare an anode having an anode active material layer (thickness: 120 μm).

3) Lamination Process

A separator was interposed between the prepared anode and cathode and stacked, and a lamination process was performed to obtain an electrode assembly. The lamination process was performed for 10 seconds at 70° C. with 5.2 MPa using a hot press.

4. Property Evaluation

After removing the anode and the cathode from the electrode assembly obtained above by peeling and taking out the separator, the organic/inorganic composite coating layer of the separator was removed using acetone to obtain a porous substrate.

TABLE 2

| | Thickness reduction rate (%) after lamination | Lamination air permeability (s/100 cc) | ER after deformation (Ohm) |
|---|---|---|---|
| Example 1 | 4 | 344 | 0.81 |
| Example 2 | 7 | 209 | 0.73 |
| Comparative Example 1 | 0.3 | 3670 | 6.10 |
| Comparative Example 2 | 1.4 | 982 | 3.46 |
| Comparative Example 3 | 43 | 121 | 0.61 |

In [Table 2], the thickness reduction rate after lamination is a percentage of the difference between A and B divided by A by comparing the thickness A of the porous substrate before manufacturing the electrode assembly and the thickness B of the porous substrate obtained by separating the electrode assembly.

In addition, the lamination air permeability is indicated by measuring the air permeability of the porous substrate after removing the organic/inorganic composite coating layer. The air permeability was measured using Asahi Seico's EG01-55-1MR equipment.

In addition, the ER after deformation is obtained by measuring the resistance of the porous substrate after removing the organic/inorganic composite coating layer. The obtained porous substrate was interposed between SUS, and an electrolyte solution was injected to prepare a coin cell, and resistance (ER) was measured by the EIS method. At this time, the frequency was in the range of 100,000 to 10,000 Hz.

When the porosity of the polymer film member is low, the thickness reduction rate is low when pressurizing in the thickness direction of the polymer film member. However, as a result of pressing in a state where the initial porosity was low, air permeability and resistance increased, resulting in the deterioration of cell performance.

On the other hand, in the case of Comparative Example 3, the initial porosity was large, and the porosity was high even after the thickness was reduced by pressing, so the thickness was additionally reduced significantly in the lamination process when manufacturing the electrode assembly. This may affect performance inferiority and safety due to continuous deformation even after battery manufacturing.

On the other hand, when the porosity of the polymer film member was 40 to 70 vol %, appropriate porosity could be secured even after manufacturing the separator substrate and electrode assembly, and there was little concern about further deformation. In addition, air permeability and resistance were shown at an appropriate level during battery manufacturing, and physical properties at a level appropriate for battery operation were secured.

The invention claimed is:

1. A method of manufacturing an electrode assembly for an electrochemical device, the method comprising:
   preparing a porous polymer film member having a porosity in a range of 40 to 70 vol %;
   preparing a separator for the electrochemical device by pressing the porous polymer film member via a pressing jig to form a porous separator substrate; and
   manufacturing the electrode assembly comprising the separator, a cathode, and an anode,
   wherein
   after the preparing of the separator, a thickness of the porous separator substrate is 90% or less compared to a thickness of the porous polymer film member which is not yet pressed.

2. The method of claim 1, further comprising forming a composite coating layer containing inorganic particles and a binder resin on one side or both sides of the porous separator substrate.

3. The method of claim 1, wherein, after the preparing of the separator, the porous separator substrate has a porosity in a range of 30 to 60 vol %.

4. The method of claim 1, wherein the preparing of the separator is performed by hot pressing.

5. The method of claim 1, wherein the pressing is performed in a pressure range of 3.0 to 8.0 MPa.

6. The method of claim 1, wherein the porous polymer film member is prepared by a wet manufacturing method in which pores are formed by extracting a pore-forming agent, and
   the porous polymer film member comprises a polyolefin resin.

7. The method of claim 1, wherein the porous polymer film member is prepared by a dry manufacturing method in which pores are formed by melting and extruding a polymer resin and subsequently stretching the extruded polymer resin.

8. An electrode assembly obtained by the method of claim 1,
   wherein the separator comprises the porous separator substrate.

9. An electrode assembly obtained by the method of claim 2, wherein the separator comprises the porous separator substrate and the composite coating layer on one or both surfaces of the porous separator substrate.

10. A method of manufacturing an electrochemical device comprising the electrode assembly obtained by the method of claim 1, wherein the separator comprises the porous separator substrate.

11. The method of claim 10, wherein the electrode assembly is prepared by disposing and laminating the separator between the cathode and the anode.

12. A method of manufacturing an electrochemical device comprising the electrode assembly obtained by the method of claim 2, wherein the separator comprises the porous separator substrate and the composite coating layer on the one or both surfaces of the porous separator substrate.

13. An electrochemical device manufactured by the method of claim 10.

14. An electrochemical device manufactured by the method of claim 12.

15. The method of claim 1, wherein the porous polymer film member is prepared by a wet manufacturing method in which pores are formed by extracting a plasticizer, and the pressing jig applies pressure over an entire surface of the porous polymer film member.

16. The method of claim 1, wherein the porous polymer film member is prepared by either (i) a wet manufacturing method in which pores are formed by extracting a pore-forming agent, and the porous polymer film member comprises a polyolefin resin, or (ii) a dry manufacturing method in which the pores are formed by melting and extruding a polymer resin and subsequently stretching the extruded polymer resin.

17. The method of claim 1, wherein the pressing is performed for a duration in a range of 1 to 20 seconds, and at a temperature in a range of 50° C. to 80° C. and a pressure in range of 5.2 to 8.0 MPa.

18. The method of claim 2, wherein the inorganic particles include $Al_2O_3$, the binder resin includes polyvinylidene fluoride-co-hexafluoropropylene, and the composite coating layer includes the binder resin and the inorganic particles in a weight ratio of 1:99 to 30:70.

19. The method of claim 2, comprising the forming of the composite coating layer on both sides of the porous separator substrate.

20. The method of claim 2, wherein a thickness of the composite coating layer is in a range of 1 to 20 μm.

* * * * *